Figure 1:
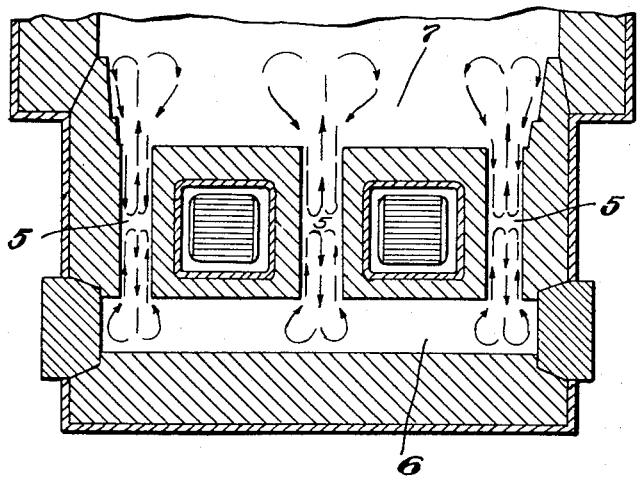

Jan. 30, 1951 M. TAMA 2,539,800
INDUCTION FURNACE
Filed March 20, 1947 3 Sheets-Sheet 1

INVENTOR:
MARIO TAMA

ATTORNEY

Jan. 30, 1951     M. TAMA     2,539,800
INDUCTION FURNACE
Filed March 20, 1947     3 Sheets-Sheet 2

INVENTOR:
MARIO TAMA
BY
ATTORNEY

Jan. 30, 1951    M. TAMA    2,539,800
INDUCTION FURNACE
Filed March 20, 1947    3 Sheets-Sheet 3

INVENTOR:
MARIO TAMA
BY
ATTORNEY.

Patented Jan. 30, 1951

2,539,800

UNITED STATES PATENT OFFICE 2,539,800

INDUCTION FURNACE

Mario Tama, Morrisville, Pa., assignor to Ajax Engineering Corporation, Trenton, N. J.

Application March 20, 1947, Serial No. 735,851

10 Claims. (Cl. 13—29)

This invention relates to means of influencing the flow and the circulation of metal melts in induction furnaces; its foremost purpose is to effect a rapid transfer of the inductively created heat to the bulk of the molten charge. The invention is particularly applicable to the flow control of the molten metal in induction furnaces of the submerged resistor type where the heat is generated in the secondary loop located underneath the melt holding hearth.

Attempts to obtain an effective and fast distribution of the inductively created heat to the molten metal charge are based on the production of a metal movement by the maintenance of temperature differences in the secondary melting channels, which for this purpose are equipped with sections of a smaller and a larger cross-area; it was assumed that a higher temperature could be obtained in the places of smaller cross-section whereby a metal flow would be initiated in one direction.

The creation of a unidirectional metal flow is indeed a major problem in induction furnaces and particularly those of the submerged resistor type and many suggestions have been continuously made in the course of the past thirty to forty years to find a satisfactory solution.

These suggestions include for instance the provision of a plurality of separate and of moving electromagnetic fields, of open loop reservoirs for the charge and closed loop channels connecting with the reservoir at remotely separated places, The arrangement of the hearth entering ends of the loop at vertically different levels, The gradual enlargement of the loop cross-area from one to the other hearth entering point, The co-axial arrangement of the primary and the secondary and the displacement from each other in an axial direction.

Some of the known constructions utilize the so-called pinch-effect and some have been designed with the purpose to prevent the disruption of the metal flow by the latter.

The above recited numerous endeavors convincingly demonstrate the importance of the flow control of the molten metal in induction furnaces; but none of them has attained the status of practical usefulness because they are based on constructional changes of the secondary loop itself.

Even if a unidirectional pressure flow is shown in the prior art from one outlet of the secondary loop through the charge into another outlet of the loop and a return flow through the latter, this flow is confined due to the heavy weight of the superposed metal charge to its lower portion; this is particularly true of deep charges where the flow impetus of the metal emerging from the loop into the hearth is soon counteracted by the weight of the charge.

As mentioned above, the movement of the molten metal in induction furnaces of the submerged resistor type is greatly influence by the pinch effect.

Due to the pinch effect a strong suction is produced at the emergence point of the melting channels into the hearth effecting a direct return movement of the molten charge into these channels.

The metal flow produced by the pinch effect in a submerged resistor type induction furnace having one or more melting loops composed of a plurality of substantially straight channels connected at their upper ends with the bottom portion of the hearth and at their lower ends with a substantially straight bottom channel, as disclosed in my U. S. Patents Nos. 2,339,964, 2,342,617, Re. 22,602, 2,374,049, 2,381,523, 2,415,974 is illustrated in attached Fig. 1, showing the bottom section of the hearth and the melting loop of a twin coil furnace.

The electromagnetic field of highest intensity is located in the center section of the straight channels 5 at about half their length. The metal is forced from this center section in an upward and in a downward direction through the melting channels, as indicated by the arrows. The molten metal stream emerging from the upper and the lower end of the channels draws the metal from adjacent portions of the charge into the same channels, whereby two lateral flow branches result which are again upwardly forced as they approach the center portion of the channels. Under the direct influence of the electromagnetic field the well known up-and-down flow of the melt through the same channel results, as shown for instance in U. S. Patent Sasnett No. 1,660,209 and indicated by the arrows in Fig. 1.

Within the range of its highest intensity the electromagnetic field has the tendency to compress the molten conductor; if the current input is sufficiently high, it may happen that the conductor is interrupted or pinched; thus the term "pinch effect" was created.

However, and as above stated, the direct return of the metal into the melting channel is the consequence of the metal pressure produced by the electromagnetic field and the resulting sucking effect in coaction with the pressure distribution in these sections of the molten charge; it will not take place in those portions or layers of a molten metal charge, which are not influenced by the electromagnetic field.

The pressure distribution resulting in the adjacent sections $x-x$ and $y-y$ at the transition point of the metal from the channel mouth into the hearth is illustrated in Figs. 1a to 1d.

Figure 1A:
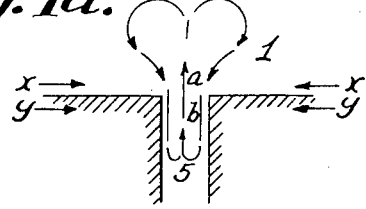
Figure 1D:
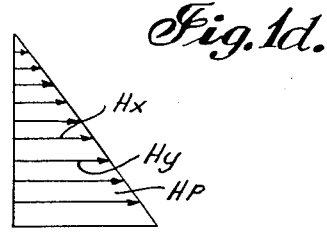
Figure 1B:
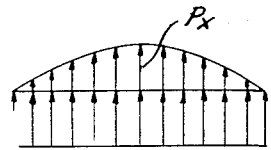
Figure 1C:
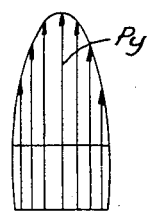

The hydrostatic pressure HP which increases from the surface of the melt downward is shown in Fig. 1d; at the point $x$ it is $H_x$, at the point $y$ it is $H_y$.

The pinch effect produces a superimposed inwardly directed pressure which, as can be shown by simple calculation, increases on a parabolic curve from the periphery of the channel toward its center, where the pressure attains its maximum. This pressure is $$P = \frac{I^2}{\pi r^2}$$

where $I$ is the current, and $r$ the radius of the conductor.

It is obvious that the pressure maximum $P_y$ in the smaller section $y-y$ is smaller than the pressure $P_x$ in the larger section $x-x$. The adjacent points $a$ and $b$ are consequently subjected to various pressures and, as will appear from Fig. 1c, the pressure at $b$ is higher than that at $a$, Fig. 1b. This causes the liquid conductor to be squirted-out in the direction $b$ to $a$; the metal upwardly propelled in the direction of the center arrow is replaced by metal drawn back from adjacent portions of the charge, as shown by the lateral arrows in Figs. 1 and 1a. A similar metal flow is produced at the emergence of the vertical channels 5 into the bottom channel 6, Fig. 1.

The described metal transport through the melting channels of the prior art furnaces has its advantages; it prevents, for instance, the overheating of the metal in the melting channels. However, the metal movement is locally limited and obviously insufficient to have a decided influence on the distribution of the heat to the charge in toto; moreover, the current input is limited and the high power factor required for the steadily increasing capacity of modern induction furnaces cannot be obtained because current increase involves the danger of the conductor being interrupted in the zone of the highest field intensity. Some of the known suggestions to create a unidirectional flow also involve difficulties in the construction of the furnaces and greatly raise the manufacturing costs.

It is the primary object of this invention to create in a submerged resistor type induction furnace an automatic unidirectional closed metal flow throughout the entire charge or its greater portion and not only through the secondary loop and the lower portion of the melt.

It is a further object of the invention to permit a practically unlimited increase of the power factor or current density without incurring the danger of interrupting the conductor or clogging the melting loop.

It is a further important object of the invention to successfully melt in these furnaces small-sized metal materials such as scrap, turnings, borings, chippings and even fine metal powders.

It is a further object of the invention to optionally increase the power factor of the furnace and to obtain with the same amount of iron in the transformer a larger power input.

It is a very essential object of the invention to produce fully homogeneous metal melts; this is of particular importance in the foundry practice of light metals.

It is also an object of the invention to further reduce slag deposition in the melting loop and particularly in the center sections of substantially vertical melting channels as the continuous unidirectional metal flow through the entire channel length prevents the slag particles from coming to rest.

With the above recited and other objects in view, which will become apparent as this specification proceeds, the invention comprises as its main element an extension or continuation of the metal movement initiated by the induced electromagnetic field from the secondary loop into a section of the metal holding hearth where the field intensity is strongly reduced or entirely eliminated. This extended flow impulse which reaches far into the upper portions or layers of the melt forces the same for replacement of the upwardly directed metal stream to flow in an opposite direction through another portion of the loop. Therefore and by elimination of the forces which draw the metal at the exit from the loop into the same portion thereof a unidirectional metal flow is produced from one portion of the loop into a high induction-free section or level of the hearth, from here through another portion of the loop and back into the first portion thereof.

In a twin coil furnace of the type disclosed in Reissue Patent No. 22,602, the metal conducted from the center channel into a current-free upper level of the hearth is replaced by metal which flows in an opposite direction through the lateral vertical channels; but no metal will be redrawn into the center channel, as shown in Fig. 1.

In this manner the important advantage is achieved that practically the total charge is forced to participate in the circulation, which is also true of furnaces having a deep hearth. A very efficient closed unidirectional circulation of the entire melt is thus achieved and the production of eddy currents at the opening ends of the melting channels is eliminated. The inductively created heat is distributed to the entire charge; a melt is obtained of thorough uniformity; small-sized metal scrap and even metal powders may be molten without difficulty. The power factor of the furnace may be optionally increased by the additional resistance interposed in the melting channels. Slag deposits in the vertical channels are prevented. The unidirectional flow principle created by the insertion of a refractory tube in the melting loop of an induction furnace is also disclosed in copending U. S. Patent applications Serial No. 647,831, filed February 15, 1946, which matured as Patent No. 2,536,325 on January 2, 1951, Serial No. 671,818, filed May 23, 1946, which matured as Patent No. 2,536,859 on January 2, 1951; Serial No. 683,115, filed July 12, 1946; and Serial. No. 755,886, filed June 20, 1947.

The invention is based on the general idea also inherent in the copending patent applications of creating in the submerged resistor type furnace a unidirectional metal flow from the melting loop into a zone which is essentially free from inductive influence; for this purpose a refractory tube is inserted with its one end into the melting loop; the tube reaches with its other end into a zone which is essentially not influenced by induction.

The above referred-to copending patent application Serial No. 683,115, filed July 2, 1946, generally claims this inventive idea.

Patent application Ser. No. 647,831, filed February 15, 1946, claims the insertion of a refractory tube into the melting loop of the furnace in such a manner that the end of the tube is spaced from the channel wall and freely reaches into the channel.

Patent application Ser. No. 755,886, filed June 20, 1947, claims the application of the general inventive idea of creating a unidirectional metal flow by the insertion of a refractory tube into a melting loop of an induction furnace having a plurality of chambers connected by this loop and the creation of a closed metal flow through these chambers and the melting loop.

Patent application Ser. No. 671,818, filed May 23, 1946, claims a method of pumping a molten metal from an induction furnace by inserting a refractory, current-conductive tube into a melting channel; certain claims include the maintenance of a small clearance between the outside of the inserted tube and the inside of the melting duct, the insertion of an additional refractory tube into the melting channel and the application of the unidirectional flow principle to a duplex induction furnace consisting of a large capacity and a small capacity melting furnace.

The present patent application claims the creation of a unidirectional closed metal flow within the melting loop and the hearth of a single induction furnace by the connection of a refractory, current conductive tube with the melting loop.

A simple manner to obtain the above described closed unidirectional flow of the entire charge resides in the location of a current conductive refractory tube, for instance, a graphite or carbon tube in the melting loop of the furnace or above the upper end thereof in such a manner that the tube forms an upward extension thereof; the tube ends within or above the melt a level which is practically free from current induction.

Several induction furnaces of the submerged resistor type embodying this invention will now be described in detail and with reference to the attached drawings.

Figure 2:
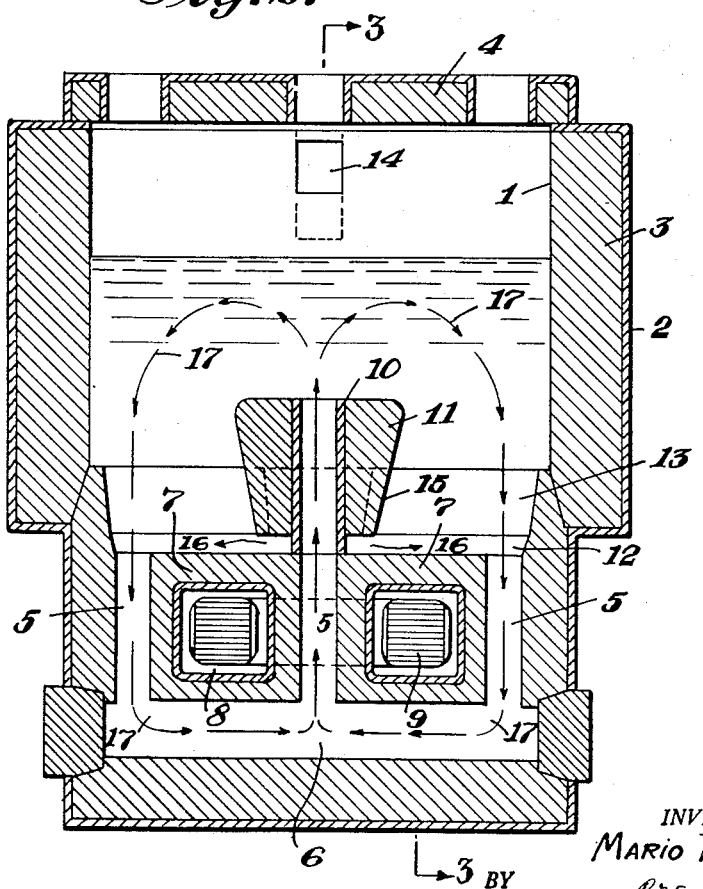
Figure 3:
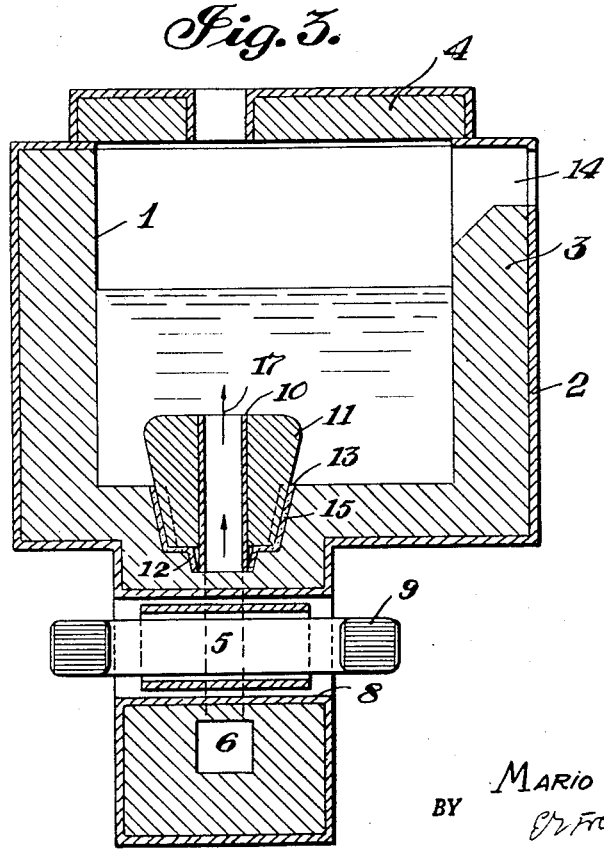

In the drawings,

Fig. 1 is a vertical section of the lower part of a furnace showing the metal flow under the influence of the pinch effect, Figs. 1ª–1ᵈ illustrate the pressure conditions which prevail in this furnace at the emergence of a melting channel into the hearth, Fig. 2 is a vertical section of a furnace otherwise identical with the one shown in Fig. 1 but equipped to produce the unidirectional metal flow in conformity with this invention, Fig. 3 is a vertical section on line 3—3 of Fig. 2.

Figure 4:
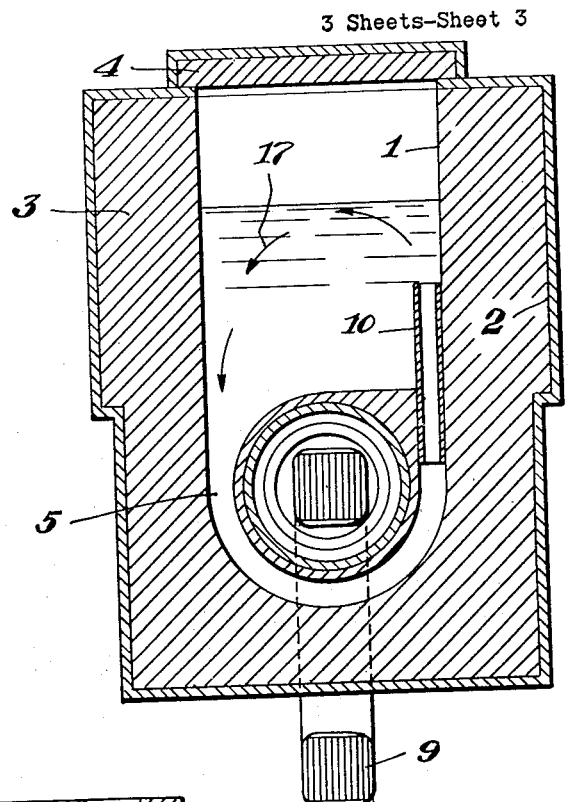
Figure 5:
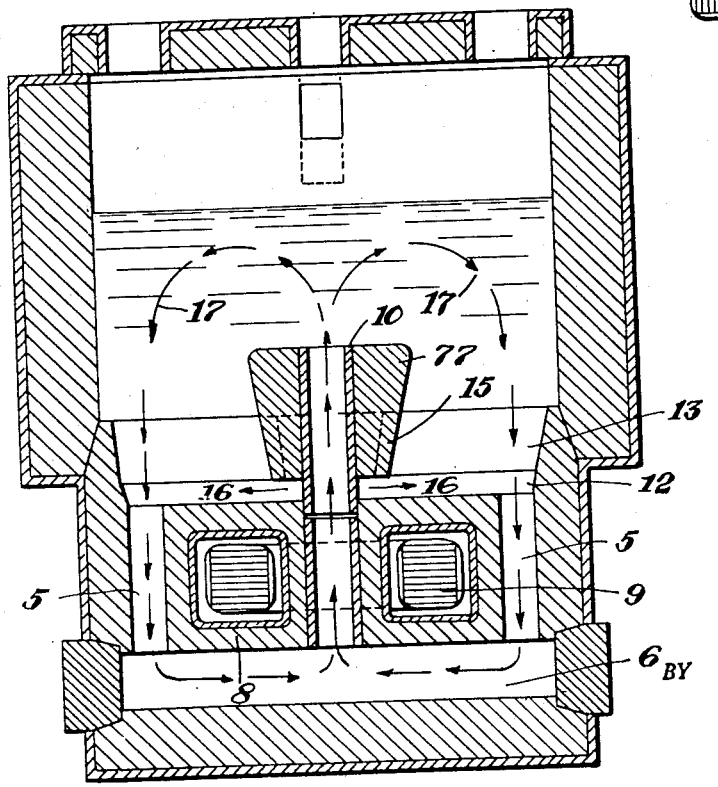

Fig. 4 shows the application of the invention to an induction furnace having a semi-circular secondary loop, Fig. 5 is a vertical sectional view of an induction furnace similar to that shown in Fig. 2 illustrating another modification of my invention.

As apparent from the drawings, in which identical parts are denoted with the same numerals, the principal parts of the furnace are a hearth 1 holding the molten charge, an inductor unit located underneath the hearth, consisting of two refractory blocks 7, a melting loop including three vertical channels 5 and a bottom channel 6 and one transformer assembly comprising two coils 8 of insulated copper wire and an iron core 9 closed toward the coil winding. The furnace is housed in casing 2 lined with a refractory 3, provided with a cover 4 and a pouring opening 14; insofar the furnace is very similar to the one disclosed in "Reissue" Patent No. 22,602.

The means creating the unidirectional closed metal movement throughout practically the entire charge, see Fig. 2, comprise a refractory, for instance, graphite tube 10 which is located and secured in a bore of conical refractory block 11. The refractory block 11 is seated in groove 13 of the hearth bottom; the tube has in the present modification of the invention a circular cross section; the block 11 may be secured to the groove 13 of the hearth bottom by a suitable binder, for instance, a layer of refractory cement 15.

Block 11 is provided with a center bore for the accommodation of tube 10. The tube extends in the present modification of the invention downwardly beyond block 11 into a second smaller groove 12 in such a manner that it reaches and substantially seals center channel 5. The tube, therefore, forms an extension of the channel; however, it is to be understood that a tight fit between the lower end of tube 10 and the channel mouth is not essential for the performance of the invention and that a clearance may be provided therebetween without influencing the effectiveness of the metal flow to any appreciable degree.

The tube is secured in the supporting block in a suitable manner to hold the same in its proper place. Tube 10 and channel 5 of which the tube forms an extension should preferably have the same inner diameter or cross area.

The upper end of the tube extends into a section of the melt which is essentially free from current induction; the proper length of the tube will vary in accordance with the particular operating conditions of the furnace; however, that section of the hearth which is practically free of induced current and which therefore decides the length of the tube may be easily ascertained as the extent of the electromagnetic field produced in the furnace can be determined without difficulty. The secondary current flows through the vertical and horizontal channels and also through the walls of tube 10, as shown by arrows 16 in Fig. 2.

The unidirectional closed movement of the metal is indicated in Fig. 2 by arrows 17.

In contradistinction to the metal movement shown in Fig. 1 the metal which leaves tube 10 at its upper end is not influenced by the electromagnetic field and naturally obeys other pressure differences than those illustrated by Figs. 1ª–1ᵈ.

The metal outflowing from tube 10 does not exert a suction on the adjacent portions of the melt in conformity with its reduced flow impetus and will similar to a fountain broaden-out in a lateral direction.

If the molten metal level is lowered so that the upper end of tube 10 lies above the same a fountain of molten metal will steadily flow from the tube thus proving that a unidirectional current of metal has been obtained through the entire charge.

The replacement of the metal outflowing from tube 10 does not take place at the transition of the tube into the hearth but from the lower end of channel 5. The flow of the metal from the center channel through the upper section of the insert into a lateral channel and the return replacement flow from the lateral into the center channel overcomes the influence of the pinch effect and the thus created metal movement signifies a principal deviation from the hitherto customary operation of induction furnaces.

Instead of locating the tube 10 above the mouth of the center channel 5, two tubes may be provided at the exit of the two lateral channels 5, hereby two closed unidirectional metal flows are created with the only difference that the flow direction will be reversed.

A unidirectional eddy-free closed circulation throughout the entire melt is therefore created by the invention, which Secures a homogeneous metal;

Lessens the danger of slag deposition in the melting loop,

Facilitates the melting of small-sized metal varieties, such as scrap and metal powders, and Renders it possible to increase the power factor of the furnace.

Another modification of the invention is illustrated in Fig. 4. The furnace is here provided with a semi-circular melting loop 5. The tube 10 is inserted into the one opening of the loop into hearth 1. The unidirectional flow of the metal through the hearth and the secondary loop is indicated by arrows 17.

Fig. 5 shows an induction furnace provided, as in Fig. 2, with a center and two lateral melting channels. In this modification of the invention the tube 10 consisting of two portions 10ª and 10ᵇ reaches through the entire length of the melting channel 5.

If the tube must be replaced for some reason only the upper portion 10ª need to be removed.

The means which shift the emergence point of the molten charge from the secondary loop into a higher hearth level are described and shown as current conductive refractory tubes. However, I wish to make it fully understood that any other device to obtain this end in a similar manner is embraced by the claims.

Moreover, it is immaterial for the performance of my invention whether the upper end of the tube ends within the molten charge or projects above the level thereof.

The invention is applicable to all types induction furnaces equipped with a metal holding hearth and a secondary loop, which latter may consist of one, two or more melting channels.

What I claim is:

1. In an induction furnace having an upper hearth, a lower secondary melting loop opening into said hearth, a primary transformer assembly threading said loop and adapted to thereby hold a metal charge in the molten state, means for the creation of a unidirectional closed flow of the metal within said furnace through the hearth and the melting loop said means including a current conductive refractory tube, said tube being connected with its one end to an opening of the loop into the hearth shifting thereby said loop opening in a substantially vertical direction within said hearth into a section thereof which is substantially free from the influence of the induced field.

2. In an induction furnace having an upper hearth, a lower secondary melting loop consisting of a center and two lateral substantially vertical channels and a substantially horizontal bottom channel, the vertical channels opening into said hearth and said bottom channel, a plurality of primary inductors threading said loop and adapted to thereby hold a metal charge in a molten state means for the creation of a unidirectional closed flow of the metal within said furnace through the hearth and the loop channels said means including a current conductive refractory tube connected with the one end to the opening of the center channel into the hearth and extending with the other end within said hearth into a section thereof which is substantially free from the influence of the induced field.

3. In an induction furnace having an upper hearth, a lower secondary melting loop opening into said hearth, a primary transformer assembly threading said loop and adapted to thereby hold a metal charge in the molten state, means for the creation of a unidirectional closed flow of the metal within said furnace through the hearth and the melting loop, said means including a refractory block having a center bore, said block being located in the bottom of said hearth in central alignment with said loop opening, a current conductive refractory tube in said bore, said tube being connected with its one end to said loop opening and extending with the other end within said hearth into a section thereof which is substantially free from the influence of the induced field.

4. In an induction furnace having an upper hearth, a bottom groove in said hearth, a lower secondary melting loop opening into said groove, a primary transformer assembly threading said loop and adapted to thereby hold a metal charge in the molten state, means for the creation of a unidirectional closed flow of the metal within said furnace through the hearth and the melting loop said means including a refractory block having a center bore, said block being located in said bottom groove in central alignment with said loop opening, a current conductive refractory tube in said bore, said tube being connected with its one end to said loop opening and extending with the other end within said hearth into a section thereof which is substantially free from the influence of the induced field.

5. In an induction furnace having an upper hearth, a step-shaped bottom groove in said hearth, a lower secondary melting loop opening into said step-shaped groove, a primary transformer assembly threading said loop and adapted to thereby hold a metal charge in the molten state, means for the creation of a unidirectional closed flow of the metal within said furnace through the hearth and the melting loop, said means including a refractory block having a center bore, said block being located on the upper step portion of said groove in central alignment with said loop opening, a current conductive vertically extending refractory tube in said bore, said tube projecting with its lower end through the lower step portion of said groove, being connected to said loop opening and extending with the upper end within said hearth into a section thereof which is substantially free from the influence of the induced field.

6. In an induction furnace having a hearth, a secondary melting loop opening into said hearth, a primary transformer assembly threading said loop and adapted to thereby hold a metal charge in the molten state, means for the creation of a unidirectional closed flow of the metal within said furnace through the hearth and the melting loop said means including a current conductive refractory tube being inserted with the one end into the loop and with the other end within said hearth into a section thereof which is substantially free from the influence of the induced field.

7. In an induction furnace having a hearth, a secondary melting loop consisting of substantially vertical channels and a bottom channel, the vertical channels opening into said hearth and said bottom channel, a primary transformer assembly threading said loop and adapted to thereby hold a metal charge in the molten state, means for the creation of a unidirectional closed flow of the metal within said furnace and through the hearth and the melting loop said means including a current conductive refractory tube, said tube being inserted with the one end into a vertical channel and extending through the length thereof and projecting with the other end within said hearth into a section thereof which is substantially free from the influence of the induced field.

8. In an induction furnace having a hearth, a secondary melting loop opening into said hearth, at least one primary transformer assembly threading said loop and adapted to hold a metal charge in the molten state, means for the creation of a substantially unidirectional closed flow of a molten charge within said furnace through the hearth and melting loop, said means including a refractory tube located with the one end in proximity of an opening of the melting loop and being elevated at the other end above the floor of the hearth thereby shifting said loop opening within said hearth into a section thereof of reduced field intensity.

9. In an induction furnace having a hearth, a secondary melting loop opening into said hearth, at least one primary transformer assembly threading said loop and adapted to hold a metal charge in the molten state means for the creation of a substantially unidirectional closed flow of a molten metal charge within said furnace through the hearth and melting loop, said means including a refractory tube located with the one end in proximity of an opening of the melting loop and being elevated at the other end above the floor of the hearth thereby shifting said loop opening within said hearth into a section thereof which is substantially free from the influence of the induced electromagnetic field.

10. In an induction furnace having an upper hearth, a lower secondary melting loop consisting of substantially vertical channels opening into said hearth and said bottom channel, at least one primary transformer assembly threading said loop and adapted to hold a metal charge in a molten state, means for the creation of a substantially unidirectional closed flow of said metal charge within said furnace through the hearth and melting loop, said means including a refractory tube located with its one end in proximity of an opening of a vertical channel and being elevated with the other end above the floor of the hearth thereby shifting said channel opening within said hearth into a section thereof which is substantially free from the influence of the induced field.

MARIO TAMA.

REFERENCES CITED

The following references are of record in the file of this patent:

UNITED STATES PATENTS

| Number | Name | Date |
|---|---|---|
| Re. 22,602 | Tama | Feb. 13, 1945 |
| 1,312,069 | Wyatt | Aug. 5, 1919 |
| 1,660,407 | Bainbridge | Feb. 28, 1928 |
| 1,792,449 | Spencer | Feb. 10, 1931 |
| 1,793,137 | Russ | Feb. 17, 1931 |
| 1,944,855 | Wadman | Jan. 23, 1934 |
| 2,339,964 | Tama | Jan. 25, 1944 |
| 2,375,049 | Tama | May 1, 1945 |
| 2,381,523 | Tama et al. | Aug. 7, 1945 |
| 2,386,369 | Thompson | Oct. 9, 1945 |
| 2,397,785 | Friedlander | Apr. 2, 1946 |

FOREIGN PATENTS

| Number | Country | Date |
|---|---|---|
| 126,947 | Great Britain | Dec. 24, 1919 |
| 142,110 | Great Britain | Apr. 20, 1920 |
| 788,006 | France | July 22, 1935 |